INVENTOR.
R. G. LeTOURNEAU
BY
F. D. Copeland Jr.
AGENT

Dec. 13, 1955 R. G. LE TOURNEAU 2,726,726
ELECTRIC VEHICLE WHEEL
Filed Aug. 23, 1950 4 Sheets-Sheet 3

INVENTOR.
R. G. LE TOURNEAU
BY
F. D. Copeland Jr.
AGENT

Dec. 13, 1955   R. G. LE TOURNEAU   2,726,726
ELECTRIC VEHICLE WHEEL
Filed Aug. 23, 1950   4 Sheets-Sheet 4
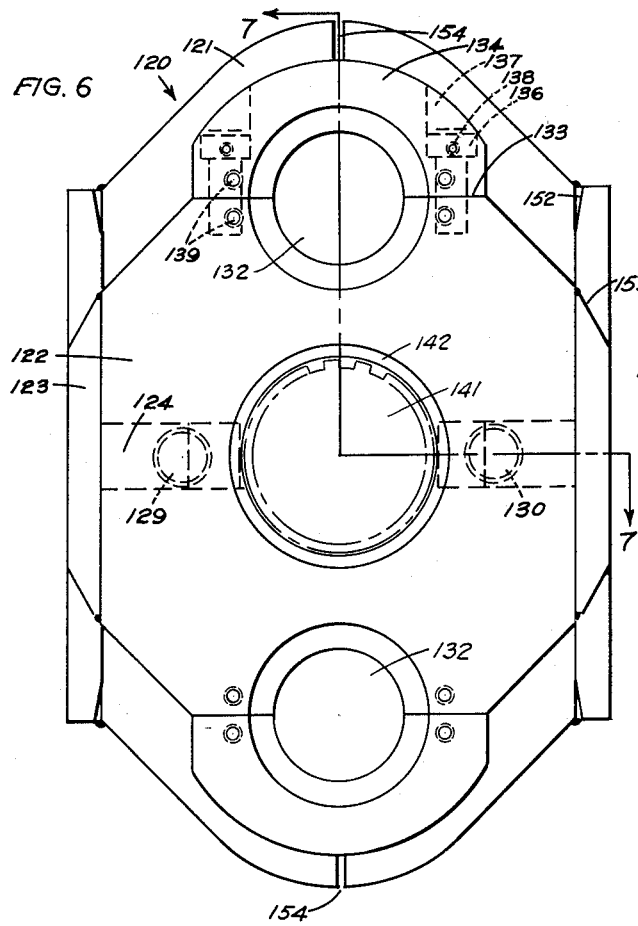
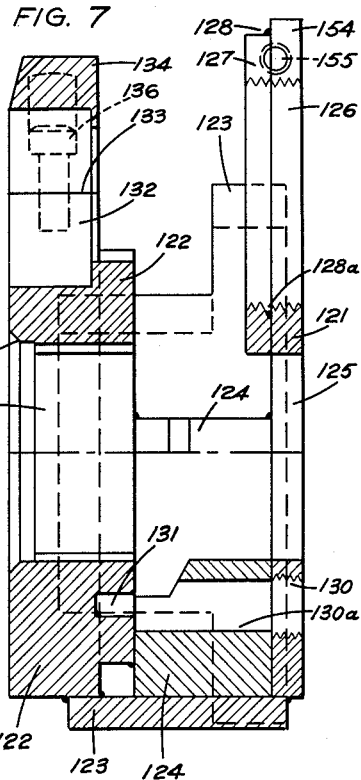
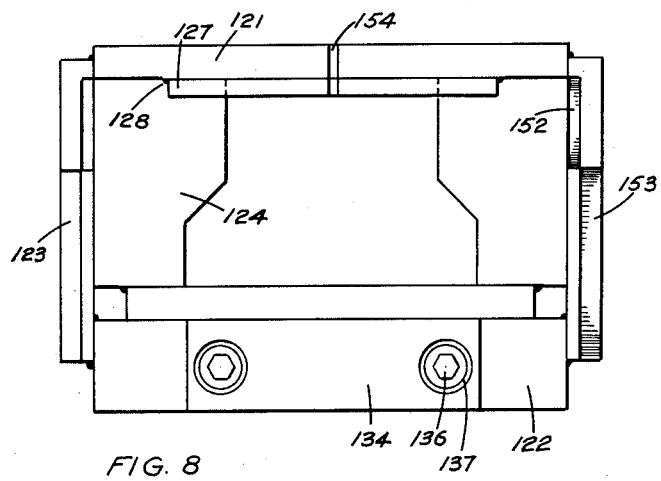
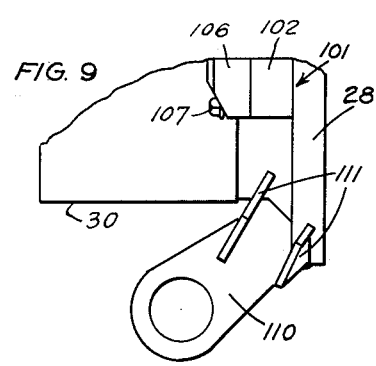
INVENTOR.
R. G. LeTourneau
BY
J. D. Copeland Jr.
AGENT

United States Patent Office 2,726,726
Patented Dec. 13, 1955

2,726,726

ELECTRIC VEHICLE WHEEL

Robert G. Le Tourneau, Longview, Tex., assignor to R. G. Le Tourneau, Inc., Peoria, Ill., a corporation of California Application August 23, 1950, Serial No. 181,038

4 Claims. (Cl. 180—60)

This invention relates to a vehicle wheel which includes an electric motor axially situated with respect to the wheel and providing the drive power for the wheel.

The primary object of this invention is to provide in a wheel driven through helical reduction gearing from an electric motor pinion, a novel gear adjustment arrangement by which the proper gear tooth contact and equalized loading between the various gears may be established.

Another object of this invention is to provide an electric motor driven wheel in which the motor housing acts also as the stationary axle about which the rotating members of the wheel may turn.

A further object is to provide a floating drive pinion which meshes with a plurality of driven gears and which requires no bearings or other support at its floating end.

A still further object is to provide a reduction gearing system for an electric motor driven wheel in which all of the gears are contained within the width of the wheel.

Yet another object is to provide a wheel including a self-contained reduction gearing system in which the rim of the wheel is part of the oil case for the system so that rotation of the wheel assists the distribution of oil and eliminates the necessity of an oil pump.

Another object is to provide a novel countershaft support spider structure to be installed within the rim of the wheel to provide bearing support for the various reduction gears.

Still another object is to provide means on the electric motor housing by which the complete unitary electric wheel may be attached to a vehicle for steerable movement.

Still another object is to provide a gear reduction system for an electric motor driven wheel in which the pinion of the motor drives a large reduction gear containing a wheel drive pinion on the countershaft therewith, which in turn drives a ring gear which is bolted to the wheel, so that the ring gear and wheel drive pinion may be replaced to obtain different wheel drive ratios.

In the drawings:

Fig. 6 is a rear view of the unique adapter employed in this wheel taken from the motor side.

Fig. 7 is a sectional view of the adapter shown in Fig. 6 taken along the lines 7—7 thereof.

Fig. 8 is a top plan view of the adapter shown in Fig. 6.

Fig. 9 is a fragmentary top view of the steering knuckle mounted at the right side of the motor housing, as shown in Fig. 3.

Fig. 10 is an end view of the centering jig used to align the motor pinion of this invention.

Fig. 11 is a plan view of the jig shown in Fig. 10.

Figure 1:
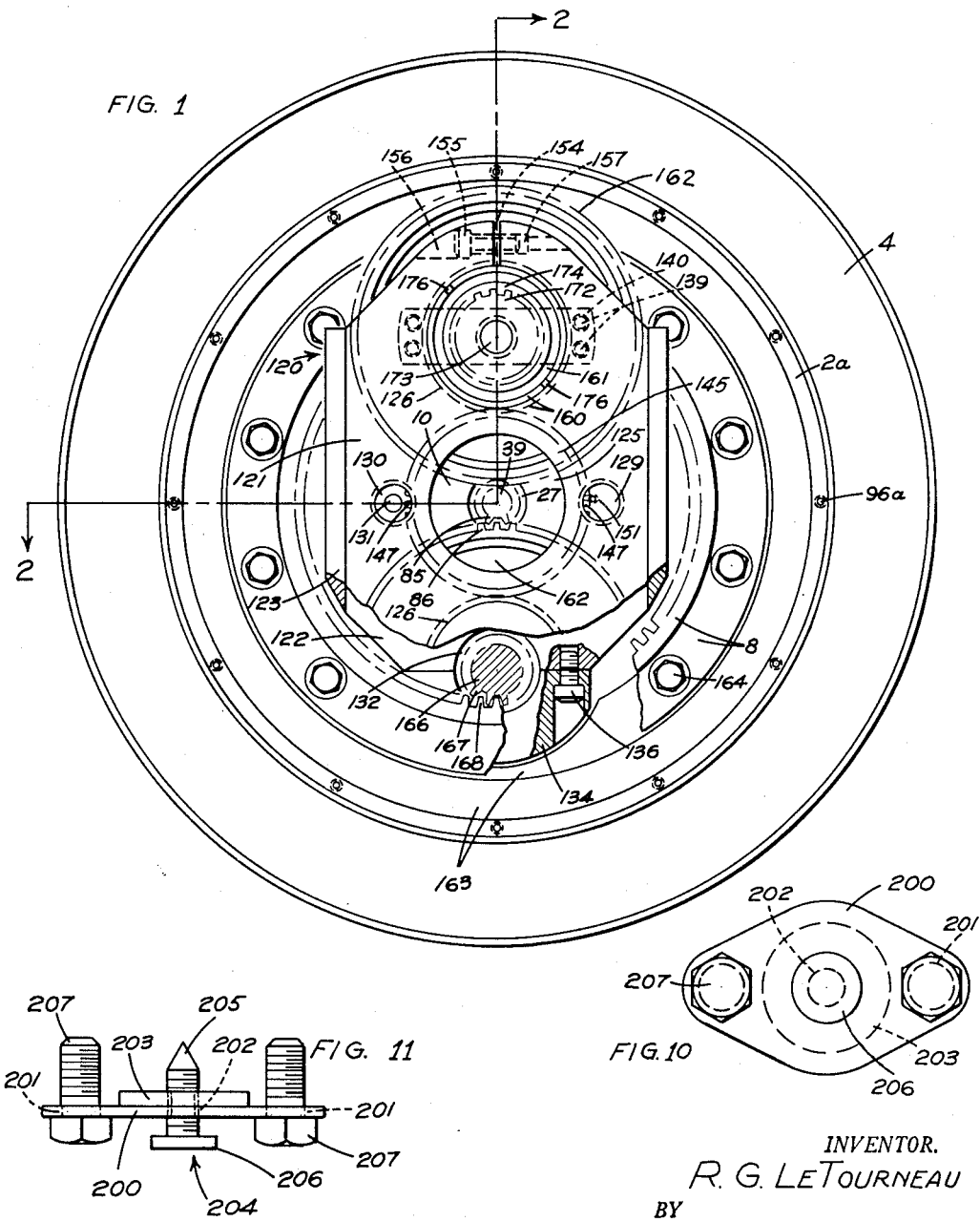
Fig. 1 represents an elevational view of a wheel unit from the reduction gearing side in which the end cover has been removed and in which fragmentary sections are taken to show certain details.

Referring now more particularly to the drawings, the complete wheel unit indicated generally at 1 (Fig. 2) is seen to consist basically of: a generally cylindrical wheel body 2 including at its outer circumferences a fixed tire retaining rim 3 and a removable tire retaining rim 4 which support a pneumatic tire 5 (shown in outline) therebetween; and an axially mounted electric motor unit 6 projecting from one side of the unit 1 and connected in driving relation to reduction gearing 7 at the other side of the wheel, which system ultimately drives an internal ring gear 8 which causes wheel body 2 to rotate through bearings 9 about motor housing extension 10.

Wheel body 2 includes supporting disks 11 which are welded to cylindrical center rim 2a of body 2 at 12 and are additionally welded at 13 to a cylindrical hub 14 which is journalled by means of bearings 9 to motor housing extension 10. Removable rim 4 is held in place by locking ring 15, which fits in groove 15a and prevents the rim 4 from moving outward beyond end of wheel body 2. A lug 16 fits into channel 16a of center rim 2a and prevents relative rotation between rim 4 and center rim 2a. At the other side of wheel body 2, the "fixed" rim 3 is prevented from moving outward by a bead 3a welded to rim 2a. Rim 3 is removable only after rim 4 and tire 5 have been removed, but rim 4 is removable for changing the tire 5 or tube 17. A flexible valve stem 18 projects through opening 19 of center rim 2a and is partially surrounded by cup-shaped cover 20 which is welded at 21 to a cut out section of one disk 11 and at 22 to rim 2a. The stem 18 terminates in a valve head 23 which is retained in a block 24 welded to rim 2a at its outside edge.

Motor unit 6 includes as part of its housing a generally cylindrical extension 10, including a central bore 27, attached to the cylindrical central frame 28 by welding 29, and an end cover 30 removably attaching frame 28 by means of bolts 31 which thread into the head of cap screws 32 which rigidly engage end bell 33 by means of three tapped holes 34. End bell 33, in addition to supporting bearing 35, includes spaced ring grooves 36 (grooves without coils shown in Fig. 3) in which reside magnetic coils 37 for releasing the spring applied magnetically released motor brake 38 associated with one end of the pinion shaft 39 of the motor. An outer drum 40 including a flange 41 is secured to end bell 33 by cap screw 32 but spaced therefrom by spacer 42. This drum 40 is threaded at its outer end 43 to receive annular adjusting ring 44, which ring is split at 45 and threaded and counterbored through the split to receive tapered head stud 46 which is engaged by nut 47 so that by tightening up nut 47, stud 46 acts to expand the ring on each side of split 45 and thereby lock threaded ring 44 in its adjusted position. Further details of this locking ring and other brake features may be observed in my co-pending application entitled Electrically Controlled Brake Unit, No. 33,118, filed June 15, 1948, which application has now become abandoned in favor of my continuation-in-part application entitled Electrically Controlled Brake Unit, Serial No. 265,075, filed January 5, 1952. A brake hub 48 includes an external spline 49 and between this spline and an internal spline 50 on outer drum 40 are interposed a series of alternately spaced externally splined brake disks 51 and internally splined brake disks 52 for engagement with splines 50 and 49 respectively. A magnetic material pressure disk 53 is shown retracted in Fig. 2 under the action of magnetic coils 37 to a position flush against end bell 33. This is the position occupied when motor unit 6 is in operation. However when motor unit 6 is receiving no electrical current, the coils 37 are not energized and pressure disk 53 is forced by means of nine compression springs 54, in counterbores 55 of end bell 33, outward into firm engagement with the disks 51 and 52. This action clamps the revolving disks 52 against the externally splined disks 51 by means of external pressure applied by pressure disk 53 and adjusting nut 44 which acts as an end plate for the brake unit 36. A channel 56 (Fig. 3) is provided between grooves 36 so that wiring for exciting coils 37 may be carried by end bell 33 but not interfere with the action of pressure disk 53. Capscrews 57 are employed to retain end bell 33 and consequently the entire brake unit 38 on the motor frame 28. Brake hub 48 is splined to pinion shaft 39 on pinion splines 58, and hub 48 includes a central boss 59 which shoulders against and retains the lower race of bearing 35. Bearing retainer 60 is attached by bolts 61 to end bell 33 to hold the upper race of bearing 35 in place.

End bell 33 is undercut at 65 to receive a fiber brush holder disk 66 which is attached thereto by any suitable means (not shown). This disk 66 supports a novel brush holder 67 and its brush unit 68 which engages a commutator 69 which delivers electrical power to armature coils 70 on laminations 71 fixed on rotor shaft 72 which is itself journalled for rotation within frame 28 by means of bearings 35 and 73. Commutator 69 is held in place on rotor shaft 72 between commutator flange 74 which is integral with rotor shaft 72 and commutator retainer 75 which is bolted to shaft 72 by bolts 76.

Motor pinion shaft 39 is located within the center hole 80 of hollow rotor shaft 72 and does not touch shaft 72 except at ridge 81 and its splines 58 which engage splines 58a of shaft 72. Ridge 81 tapers as at 82 down to the inner diameter of splines 58 so that when pinion nut 83 tightens on threads 84 of pinion shaft 39, the brake hub 48, pinion shaft 39, and rotor shaft 72 are all drawn into firm engagement with each other. Since pinion shaft 39 is extremely long relative to its diameter, and since its pinion 85 is at the unsupported end of the shaft, this pinion can be easily moved, as will later be described, into equal engagement with countershaft gear teeth 86 of both countershaft reduction gears 162, and it will tend to equalize tooth loading in the engagement since it is free to float in space to a limited extent. A long unsupported shaft such as 39 is known to have desirable qualities of absorbing otherwise dangerous torsional vibration. One unobvious quality of this described arrangement is that it has been discovered that the pinion 85 will remain in engagement after having once been centered and will not jump out of engagement as would be supposed when placing a small unsupported gear into engagement with two diametrically opposed fixed position gears. The invention is also adapted for use with more than two reduction gears meshing with the drive pinion. Thus it is within the scope and spirit of the invention to use three, four or more countershafts and reduction gears in the gear group with the drive pinion and the final ring gear.

Motor housing extension 10 includes a bearing housing 87 for bearing 73 which also houses a seal 88 which cooperates with housing 87 and rotor shaft 72 to prevent oil from oil case 89 from entering the interior of motor frame 28 where rotor windings 70 and stator windings 90 (on laminations 91) are situated. It will be observed that oil can enter bore 27 and lubricate bearings 73 and can travel into center hole 80 as far as ridge 81 in addition to circulating throughout the entire oil case 89 due to movement of wheel body 2 which, together with wheel cover 95, forms the walls for case 89. Cover 95 is attached to center rim 2a by a circle of bolts 96 which engage bolt holes 96a in rim 2a. Filler plug 97 is provided centrally of cover 95 to permit filling case 89 with oil to approximately the half-way mark. Bearing 9 also receives lubricant from the oil case 89, since a passage for oil is available all the way to sealing ring 98 which operates between lip 99 of motor housing extension 10 and lip 100 of wheel hub 14.

It will be seen that motor housing extension 10, together with motor frame 28, acts as the stationary axle of the complete unit 1. This axle is supported from the vehicle by spaced vertically alinged bearing pins (indicated generally at B) which are clamped in free turnable relation in bearing 101 which comprises: a fixed half bearing box 102 welded at 103 to lug 104 in turn welded at 105 to central frame 28 of the motor unit 6; and a removable bearing cap 106 which is bolted to half bearing box 102 by means of bolts 107, which together with lockwashers 108, are seated in counterbore 109 when tightened into firm threaded engagement with half bearing box 102. This arrangement permits the complete unit 1 to be pivoted about a vertical line between upper and lower bearings 101 and 101a, so that the addition of eye-piece 110, which is welded to brackets 111 which are in turn welded to frame 28, provides a means for individual steering of each wheel when mounted on a vehicle.

Figure 2:
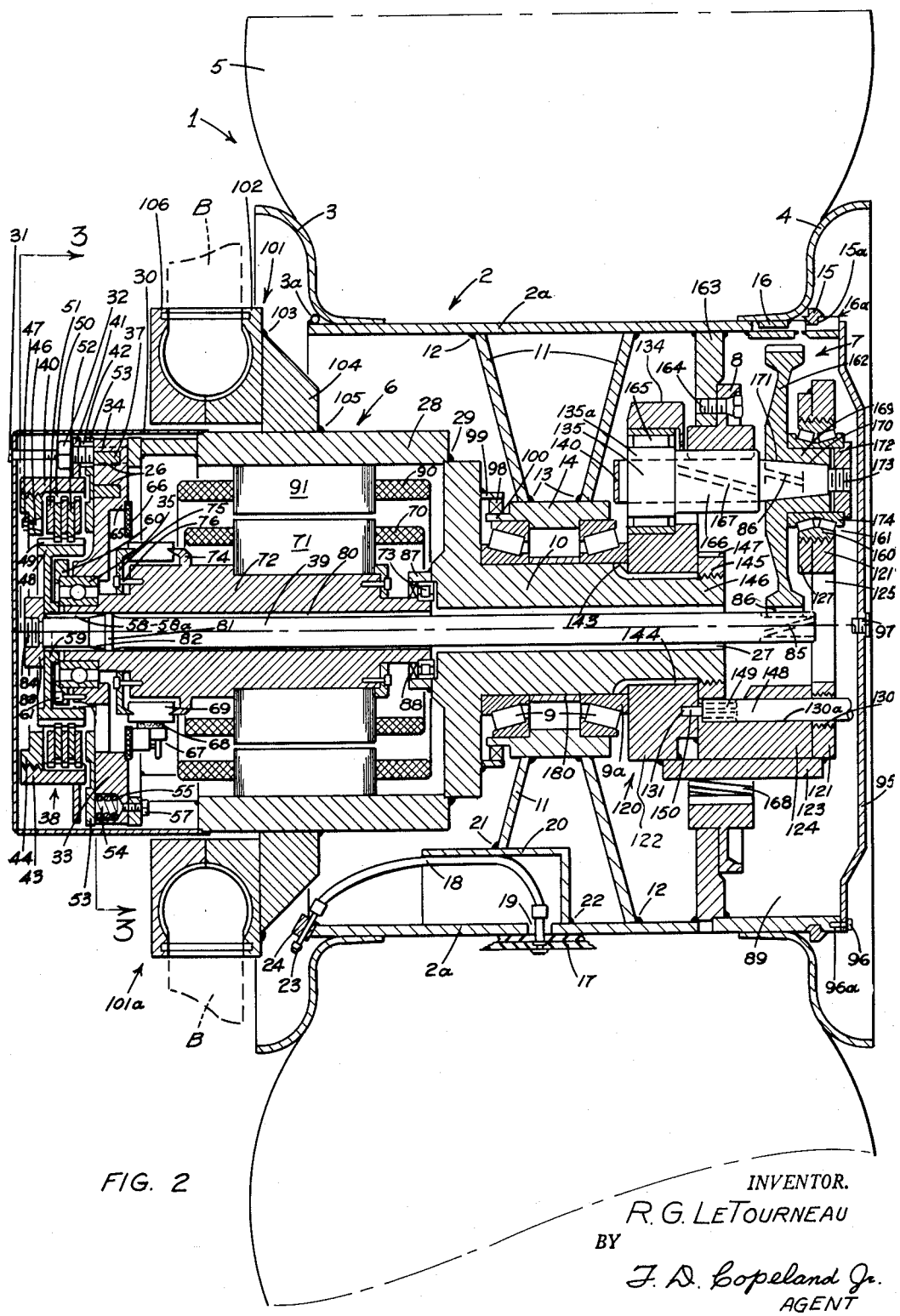
Fig. 2 represents a sectional view of the wheel in Fig. 1 taken along the lines 2—2 thereof.

The novel spider, indicated generally at 120, is used to support the reduction gearing 7 within the oil case 89 to provide driving connections between motor-driven pinion 85 and ring gear 8 of the wheel body 2. This spider may be examined in Fig. 2 with reference to Figs. 6–8. The basic unit is made up of a front plate 121, a rear plate 122, spaced apart by T-shaped side plates 123 and L-shaped spacers 124. The front plate 121 has a center opening 125 and diametrically opposed threaded openings 126 on each side thereof. The threaded openings are reinforced by aligned threaded rings 127 welded to the back of front plate 121 at 128 and 128a. At each lateral side of center opening 125 are two small threaded holes 129 and 130; these holes extend into L-shaped spacers 124 as shown at 130a. Beyond hole 130a in back plate 122 is a smaller diameter blind hole 131 for a purpose later described. Back plate 122 includes holes 132 which align with threaded openings 126 of the front plate 121. That portion of the back plate 122 surrounding the holes 132 is separable along a horizontal center line as at 133 (Figs. 6 and 7), so that cap plate 134 can be removed to facilitate installation of countershafts 135 in the assembly of the wheel. Capscrews 136 are inserted in countersunk and threaded openings 137 and when tightened to the desired degree, a set screw 138 prevents capscrew 136 from working loose. When cap plate 134 is thus attached as part of the back plate 122, tapped holes 139 on each side of holes 132 are in position to receive bolts for positioning a retainer strap 140 (Figs. 1 and 2) which limits the rearmost position of countershaft 135 and its pressed-on bushing 135a at assembly and under operating conditions. Back plate 122 also contains a splined center opening 141 which is beveled at 142 for engagement with a corresponding bevel 143 on motor housing extension 10 at the time the splines 144 of extension 10 engage splines of opening 141 (Fig. 2).

When spider 120 is installed on extension 10, an internally threaded nut 145 engages the threaded end 146 of extension 10 and causes bevels 142 and 143 to seat and thus result in a rigid engagement of the spider and extension through their corresponding splines 144 and 141. Nut 145 is externally splined as at 147, and to permit tightening during assembly, a wrench 148 including teeth 149 is inserted through holes 130 and 130a until tip 150 of wrench 148 is seated in blind hole 131 in free turning relation. Wrench 148 may now be rotated in either direction to tighten or remove nut 145 as desired. At a diametrically opposite position on face plate 121 (Fig. 1), the second hole 129 presents an opening for a set screw wrench to be inserted to tighten or remove set screw 151 which threads into back plate 122 at a point between the teeth of spline 147, so that when threaded into position the nut 145 is incapable of movement and is effectively locked in its position. T-shaped side plate 123 includes oppositely inclined tapers 152 and 153 to provide clearance at installation for operation of countershaft gears and ring gear 8 respectively. Face plate 121 is slotted at its top and bottom at 154 from threaded opening 126 to the outer edge of the plate. This slot is bridged at assembly by bolt 155 which engages countersunk slot 156 on one side of the slot and extends into and engages threaded hole 157 on the other side of the slot 154. This construction provides a means for locking the threaded outer race 160 of bearing 161 of countershaft gear 162 after the race 160 has been threadedly adjusted to desired position.

At final assembly the spider 120 will have been installed on extension 10, and ring gear 8 will be fastened to flange 163 by means of capscrews 164, and the reduction gearing 7 will occupy the position now described. Countershaft 135 including bushing 135a is inserted in bearings 165 seated in holes 132 and countershaft pinion 166 including helical teeth 167 will be in mesh with the helical teeth 168 of ring gear 8. Countershaft gear 162 includes a hub 169 with an internal tapered and serrated bore 170 which matchingly engages the tapered and serrated portion 171 of countershaft 135. When helical teeth 86 of gear 162 are in mesh with helical teeth 85 of pinion shaft 39, the bearings 161 may be installed on hub 169 by threading the outer race 160 into threaded opening 126. Nut 172 is then threaded onto shank 173 of countershaft 135 so that it acts as a retainer for inner race 174 of bearings 161.

During assembly, it is necessary to center pinion shaft 39 so that equal tooth engagement will be provided for all of the gears of gearing 7. For this purpose the holes 129 and 130 provide an excellent guide for inserting a center jig so that it may be determined just when pinion 39 is accurately centered. However any well known means may be employed to gage the exact center of the assembled unit. One of the main features of this invention is the manner of accomplishing the adjustment, as follows. Before this adjustment is accomplished, the pinion shaft 39 will be to the right or left of the vertical center line; by advancing or retracting outer race 160, by means of its wrench engaging wrench slots 176, the countershaft 135 and gear 162 are moved axially of the wheel; when this happens teeth 167 move along the helical angle of teeth 168 of gear 8 so that countershaft 135 will rotate slightly causing gear 162 to rotate and move pinion shaft with it and in a lateral direction toward the center of the wheel. The fact that shaft 39 is unsupported at its pinion end will permit it to "float" slightly in an attempt to equalize the load between itself and driven gears 162, and will provide a means for absorbing and reducing torsional vibration. The countershaft 135 and its bushing 135a will move in an axial direction within bearing 165 during this adjustment. When the shaft 39 has been moved to the exact center of the wheel, as measured by the center jig, the outer race is locked in position by tightening bolt 155 and causing slot 154 to contract and bind the threads of hole 129 against the threads of outer race 160.

The spider 120, when in place, also serves as a retainer for main wheel bearings 9 by abutting against the inner races 9a and clamping them firmly between motor housing extension 10 and bearing spacer 180.

Figure 3:
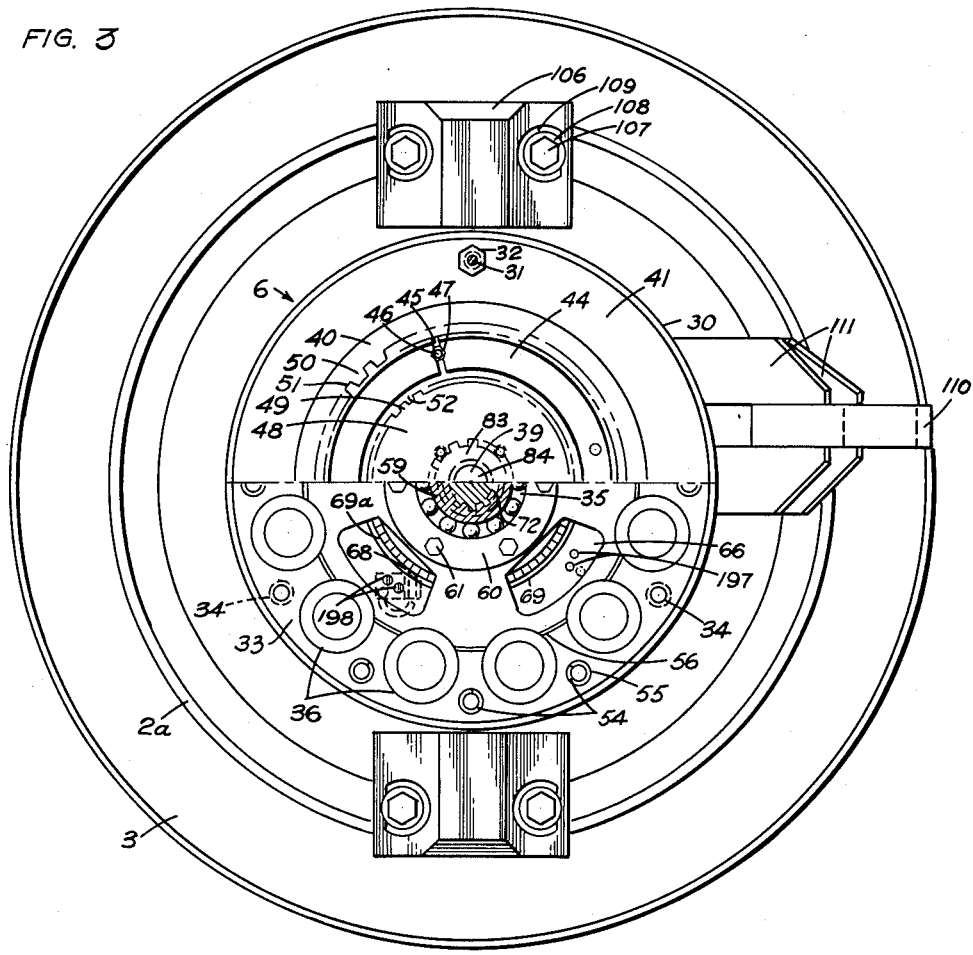
Fig. 3 represents an elevational view of the motor side of the wheel (less tire) with a section taken along the lines 3—3 of Fig. 2.
Figure 4:
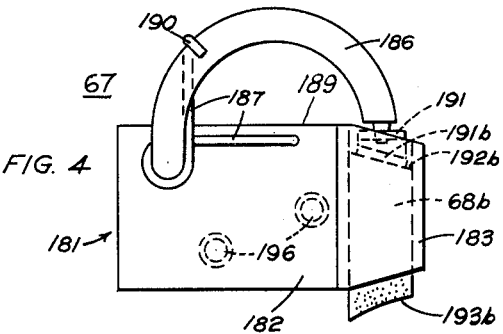
Fig. 4 is a side view of the brush holder employed on this motor.
Figure 5:
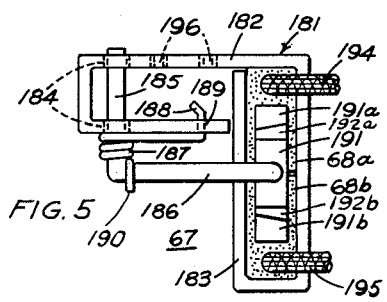
Fig. 5 is a plan view of the brush holder shown in Fig. 4.

Turning now to Figs. 3–5, the details of the novel brush holder may be observed. The body 181 of the holder is made of a single piece of metal strap which is bent into an L-shaped outline with two hollow legs 182 and 183. One leg 182 is drilled through at 184 to receive the horizontal pivot shank 185 of rocker arm 186. A spring 187 has one end 188 inserted in hole 189 of leg 182 and bent and the other end 190 curved to encircle rocker arm 186 so that it will be urged downward against pressure strip 191 which has its ends 191a and 191b bent to rest flush with the top tapered surfaces 192a and 192b of carbon brushes 68a and 68b, which brushes are curved at their lower ends as at 193b to ride flush against the curved circumference 69a of commutator 69. Leads 194 and 195 introduce electric current from an outside source (such as a motor driven generator) to brushes 68a and 68b of brush unit 68 respectively and from the brushes the current passes through the commutator to armature windings 70 to operate the motor. Windings 90 may be separately excited from the same generator if desired. The brush holders 67 are installed by means of tapped holes 196 of leg 182 which align with drilled holes 197 of fibre ring 66 which suspends the brushes from stationary end bell 33. Screws 198 are inserted in holes 196 and 197 and when tightened will rigidly secure the brush holders 67 to ring 66.

If it is desired to provide for a speed for the wheel unit which is faster or slower than the range available from motor 6 and the gear ratios provided by reduction gearing 7 and ring gear 8, this may be accomplished by installing another countershaft in place of countershaft 135 which has a different tooth pinion thereon. Then if a corresponding tooth ring gear is installed for gear 8, a different wheel drive ratio will result. The same reduction gear 162 may be used since it is separable from countershaft 135. A different vehicle speed will likewise result if the tire size is changed. So it will be seen that in this combination of a variable speed D. C. motor unit, a selective wheel drive ratio, and the use of different tires will result in a wide range of available speed and power in a wheel unit so that the requirements of a variety of machines or vehicles will be met.

Details of the centering jig used to determine when the motor pinion shaft 39 has been centrally adjusted between gears 162 may be seen in Figs. 10 and 11. It consists of an oblong plate 200 with two drilled holes 201 at the outer sides of the plate and a central tapped hole 202. The two outer holes are located to align with tapped holes 129 and 130 of spider 120, and the central hole is concentric with center opening 125 of the spider and also recess 27 of motor housing extension 10. Plate 200 includes a boss 203 which is accurately machined to permit a close sliding fit into hole 125. An aligning screw 204, threaded thru central hole 202, includes a pointed tip 205 and a knurled hand wheel 206. The two holes 201 receive capscrews 207 to permit the jig to be held in place while the alignment is being made. When boss 203 is snugly seated in hole 125 and capscrews 207 are tightened into holes 129 and 130, the hand wheel 206 is turned to advance screw 204 in hole 202 until the tip 205 is near the end of pinion 39. If the alignment is correct, tip 205 will mesh with the countersunk center hole (present in most machined parts) of pinion 39. If it is not in perfect alignment, bearing 161 is turned as previously described until the desired alignment has been attained.

From the foregoing description it will be readily seen that there has been produced such a device as substantially fulfills the objects of the invention as set forth herein.

While this specification sets forth in detail the present and preferred construction of this invention, still in practice such deviations from such detail may be resorted to as do not form a departure from the spirit of the invention, as defined in the appended claims.

Having thus described this invention, what is claimed as new and useful and is desired to be secured by Letters Patent is:

1. A wheel comprising a wheel body journalled to a nonrotatable mounting structure, a helical ring gear fixedly secured on the body, a power driven pinion shaft rotatably mounted at one end on the mounting structure and freely floating at the other end, a helical pinion fixedly secured adjacent said freely floating end of said pinion shaft, a plurality of countershafts journalled in said structure, a helical gear fixedly secured on each countershaft and meshing with the pinion, a helical countershaft pinion fixedly secured on each countershaft in spaced relation from its associated helical gear, said ring gear meshing with each countershaft pinion, said countershaft gears having hubs, and adjusting means for said countershaft gears comprising adjustable thrust bearings for rotatably supporting said hubs in the mounting structure and for imparting axial motion to said countershaft gears and thereby centering and positioning the freely floating end of the pinion shaft and its pinion between the gears for substantially equal pressure distribution throughout the gearing system.

2. A wheel as set forth in claim 1, the mounting structure being rigid and having a back plate in which the countershafts are journalled, a hollow shaft on which said wheel body is journalled and a front plate, the front plate having threaded holes therein, the outer races of said thrust bearings having threads for engagement in the threaded holes whereby upon rotation of the outer races the axial movement may be imparted to the countershaft gears.

3. A wheel as set forth in claim 2 in which the axial movement of the countershaft gears causes rotary movement of the drive pinion.

4. An electric motor driven wheel structure, comprising: an electric motor having a stator shell having a rotor therein, said rotor being provided with a hollow rotor shaft, a hollow axle having a central wheel bearing mount portion, an integral flange portion at one end of said hollow axle, and a gear carrier mount portion at the other end thereof, and means for fixing said stator shell to said flange with said hollow shaft in axial alignment with said hollow axle, and a driving shaft fixed to said rotor shaft at the end thereof remote from said flange and extending freely through said aligned hollow rotor shaft and hollow axle.

References Cited in the file of this patent

UNITED STATES PATENTS

| | | |
|---|---|---|
| 672,713 | Sanchis | Apr. 23, 1901 |
| 716,065 | Ledwinka | Dec. 16, 1902 |
| 866,410 | Walker | Sept. 17, 1907 |
| 1,808,748 | Apple | June 9, 1931 |
| 1,840,407 | Norman | Jan. 12, 1932 |
| 1,934,350 | Hartman | Nov. 7, 1933 |
| 1,988,338 | Schmitter et al. | Jan. 15, 1935 |
| 2,257,747 | Jones, Jr. | Oct. 7, 1941 |
| 2,258,328 | Lee et al. | Oct. 7, 1941 |
| 2,270,980 | Tidball | Jan. 27, 1942 |
| 2,327,777 | Falk | Aug. 24, 1943 |
| 2,357,742 | Jeffrey | Sept. 5, 1944 |
| 2,386,917 | Thornton | Oct. 16, 1945 |
| 2,437,314 | Berndston | Mar. 9, 1948 |
| 2,495,184 | Samzelius | Jan. 17, 1950 |
| 2,529,330 | Double | Nov. 7, 1950 |
| 2,555,586 | Falk | June 5, 1951 |
| 2,598,876 | Ash | June 3, 1952 |

FOREIGN PATENTS

| | | |
|---|---|---|
| 746,976 | France | Mar. 21, 1933 |
| 517,465 | Great Britain | Jan. 31, 1940 |
| 329,405 | Italy | Sept. 6, 1935 |